United States Patent
Dixon

(10) Patent No.: US 6,289,461 B1
(45) Date of Patent: *Sep. 11, 2001

(54) BI-DIRECTIONAL PROCESS-TO-PROCESS BYTE STREAM PROTOCOL

(75) Inventor: Michael D. Dixon, Palo Alto, CA (US)

(73) Assignee: Placeware, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,388

(22) Filed: Jun. 9, 1998

(51) Int. Cl.[7] .............................. G06F 11/30; H04L 9/00
(52) U.S. Cl. ........................................... 713/201; 709/230
(58) Field of Search .................................. 713/200, 202, 713/201; 709/203, 202, 220, 224, 227, 229, 230

(56) References Cited

U.S. PATENT DOCUMENTS

| | | | |
|---|---|---|---|
| 5,430,876 | 7/1995 | Schreiber et al. | 709/304 |
| 5,499,343 | 3/1996 | Pettus | 709/203 |
| 5,713,017 * | 1/1998 | Lin et al. | 395/608 |
| 5,721,908 * | 2/1998 | Lagarde et al. | 395/610 |
| 5,732,219 * | 3/1998 | Blumen et al. | 395/200.57 |
| 5,778,174 * | 7/1998 | Cain | 395/187.01 |
| 5,805,803 * | 9/1998 | Birrell et al. | 395/187.01 |
| 5,815,665 * | 9/1998 | Teper et al. | 395/200.59 |
| 5,826,014 * | 10/1998 | Coley et al. | 713/200 |
| 5,850,517 * | 12/1998 | Verkler et al. | 395/200.32 |
| 5,935,211 * | 8/1999 | Osterman | 709/228 |

* cited by examiner

*Primary Examiner*—Dieu-Minh Le
(74) *Attorney, Agent, or Firm*—Finnegan, Henderson, Farabow, Garrett & Dunner, L.L.P.

(57) ABSTRACT

A client system stores messages and sends the messages to a server system. The messages are included in a request formatted according to a protocol that can traverse a firewall. Then the client system waits for a response from the server system. The response will also be formatted according to the protocol that can traverse the firewall. The response will include an indication of which messages the server system received from the client system in the last request. If a certain number of messages accumulate at the client system, or a certain amount of time passes before the response is received, the client system will send a second request. The server system also stores messages and sends the messages to the client system. The server system waits for a first request and a second request from the client system. If the first request has been received and a particular number of messages have accumulated at the server system, then the server system will send a response corresponding to the first request. If the second request is received, the server system will send the response corresponding to the first request even if no messages have accumulated. The response will include any accumulated messages. The next time the client system sends a request, the request will include an indication of which messages the client system received from the server system in the last response.

11 Claims, 6 Drawing Sheets

| HTTP FORMATTED REQUEST |
|---|
| HTTP HEADER |
| MESSAGES 1-N RECEIVED |
| MESSAGE 1 |
| ⋮ |
| MESSAGE M |

FIG. 4

| HTTP FORMATTED RESPONSE |
|---|
| HTTP HEADER |
| MESSAGES 1-M RECEIVED |
| MESSAGE 1 |
| ⋮ |
| MESSAGE N |

FIG. 5

BI-DIRECTIONAL PROCESS-TO-PROCESS BYTE STREAM PROTOCOL

BACKGROUND OF THE INVENTION

1. Field of the Invention

The present invention pertains to the field of distributed computer programs. More particularly, this invention relates to the art of bi-directional, process-to-process byte stream protocols.

2. Background

Advances in computer technology and the advent of the internet have enabled computer users to collectively execute computer programs from points distributed around the world. Examples of distributed programs include computer chat rooms, conferencing programs, and gaming programs wherein multiple computer users can interactively exchange information in real time. For instance, a computer chat room may allow a number of distributed users to view conversational text as it is typed by any one of the individual distributed users, a conferencing application may allow distributed users to collectively draft and edit a single text document, and gaming programs may allow distributed users to compete or collaborate in a virtual gaming environment.

In order to perform distributed programming, it is necessary for two individual processes to maintain a bi-directional byte stream. A process refers to an active execution of a computation, and is also commonly referred to as a task, job, or thread. Distributed programming is frequently based on the client-server paradigm, wherein a process executing on a client system must communicate with a process executing on a server system.

In the client-server paradigm, a client process makes requests for access to and information from a server process. A client process and server process may be executing on the same computer system or they may be executing on separate, communicatively coupled systems. Where a server system is accessible by a network, like the internet, a huge number of client systems from around the world may make requests on a server system.

Communications between clients and servers often involve transmitting data over various media within or among various networks. These communications media are often unreliable. The internet, for instance, is global in scale and relies on countless individual computers and connections. The failure of any one part of the internet cannot be predicted or prevented, making the internet inherently unreliable. Transmission Control Protocol/Internet Protocol (TCP/IP) comprises a number of communications protocols designed to reliably transmit data in spite of the inherent unreliability of the internet. In very general terms, TCP/IP verifies that data arrives, and automatically re-transmits segments that do not. Most distributed programs that communicate over the internet use TCP/IP formatted messages to insure reliability.

In addition to reliability, security is a major concern for network users. Many systems use firewalls to selectively block certain kinds of network communications. For instance, most firewalls prevent TCP/IP communications, blocking the bi-directional byte streams commonly used for distributed programming.

Therefore, in order to utilize distributed programming, a need exits for a bi-directional, process-to-process byte stream protocol that can traverse a firewall, maintain the level of security provided by the firewall, and provide reliable communications over inherently unreliable media.

SUMMARY OF THE INVENTION

A client system stores messages and sends the messages to a server system. The messages are included in a request formatted according to a protocol that can traverse a firewall. Then the client system waits for a response from the server system. The response will also be formatted according to the protocol that can traverse the firewall. The response will include an indication of which messages the server system received from the client system in the last request. If a certain number of messages accumulate at the client system, or a certain amount of time passes before the response is received, the client system will send a second request.

The server system also stores messages and sends the messages to the client system. The server system waits for a first request and a second request from the client system. If the first request has been received and a particular number of messages have accumulated at the server system, then the server system will send a response corresponding to the first request. If the second request is received, the server system will send the response corresponding to the first request even if no messages have accumulated. The response will include any accumulated messages. The next time the client system sends a request, the request will include an indication of which messages the client system received from the server system in the last response.

BRIEF DESCRIPTION OF THE DRAWINGS

Examples of the present invention are illustrated in the accompanying drawings. The accompanying drawings, however, do not limit the scope of the present invention whatsoever. Like references in the drawings indicate similar elements.

FIG. 4 illustrates one embodiment of an HTTP formatted request.

FIG. 5 illustrates one embodiment of an HTTP formatted response.

DETAILED DESCRIPTION

In the following detailed description, numerous specific details are set forth in order to provide a thorough understanding of the present invention. However, it will be understood by those skilled in the art that the present invention may be practiced without these specific details and that the present invention may be practiced in a variety of alternate embodiments. In other instances, well known methods, procedures, components, and circuits have not been described in detail.

Figure 1:
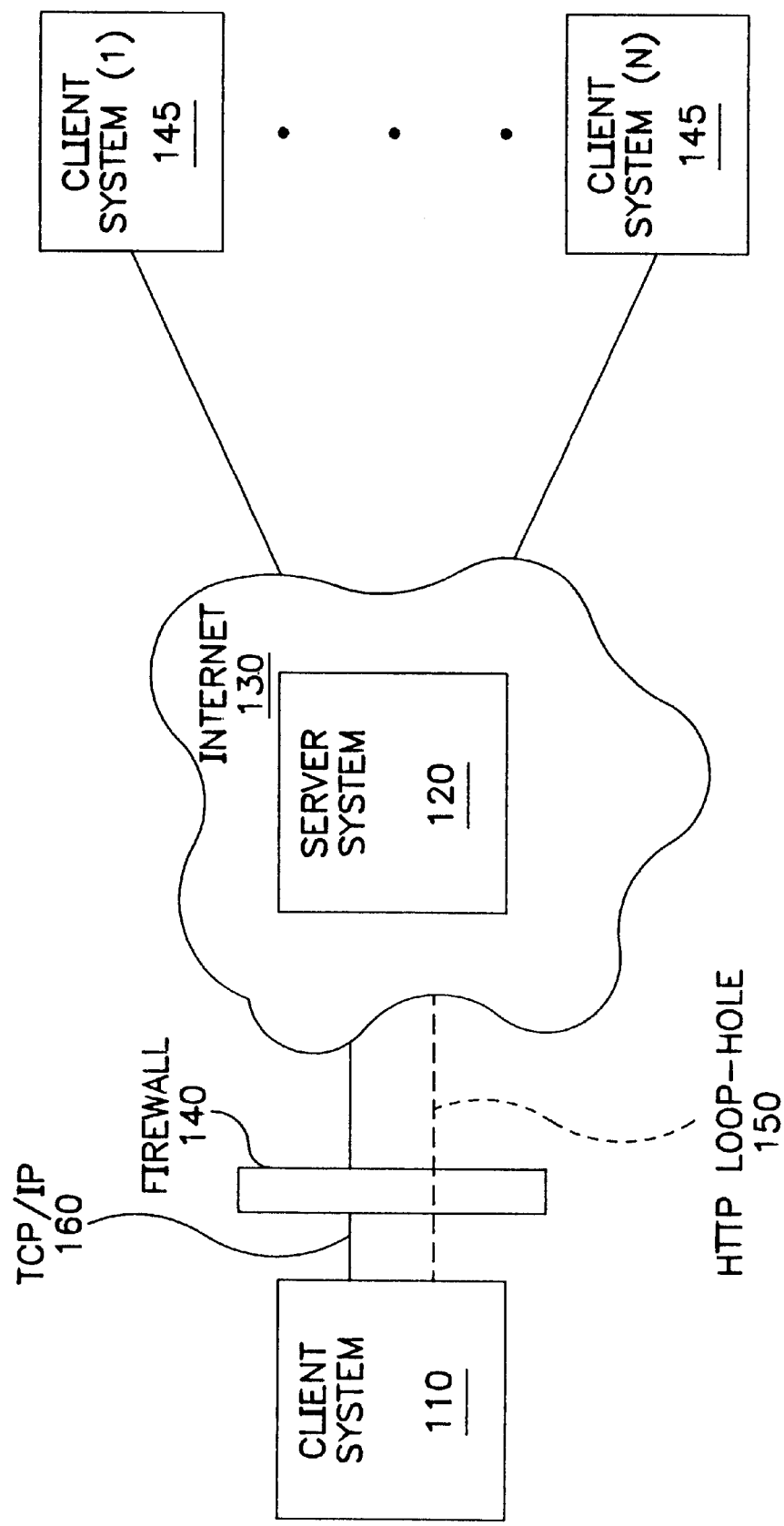
FIG. 1 illustrates one embodiment of a computer network.

FIG. 1 illustrates one embodiment of a computer network in which a firewall interferes with the execution of a distributed computer program. A process executing on client system 110 is prevented from communicating with a process executing on server system 120 using Transmission Control Protocol/Internet Protocol (TCP/IP) 160 formatted communications. As discussed more fully below, however, the present invention takes advantage of a common loop-hole in most firewalls to create TCP/IP-type communications that can traverse firewalls.

Distributed programming includes virtually any kind of client-server interaction. For example, a process may be executed on a client system which communicates with another process that is executed on a server system. In certain applications, the client process is referred to as an applet and the server process is referred to as a servlet. Communications between the two processes comprise the distributed programming. Several client processes may concurrently interact with a single server process.

In the illustrated embodiment, client system 110 and client systems 145 are coupled to internet 130. Internet 130 includes server system 120. In one embodiment, client system 110, client systems 145, and server system 120 collectively execute a distributed computer program wherein part of the program is executed on server system 120 and part of the program is executed on each of the client systems. Except for the teachings of the present invention, client system 110, server system 120, and client systems 145 represent any of a number distributed systems known in the art.

Messages are sent to and from each of the client systems and server system 120 over a variety of connections through internet 130. Except for the teaches of the present invention, communications through internet 130 are conducted in any of a number of manners known in the art. The distributed program can be any of a number of distributed programs, including computer chat rooms, conferencing programs, and gaming programs.

Client system 110 is protected by firewall 140 which selectively blocks communications, including TCP/IP 160 formatted communications, making the execution of most distributed programs impossible. As is frequently the case, however, firewall 140 allows users of client system 110 to browse web pages on internet 130. Loop-hole 150 is provided for this purpose, and it allows HyperText Transfer Protocol (HTTP) formatted transactions to pass through firewall 140. HTTP transactions are used to access web pages on internet 130. A single HTTP transaction has two parts. The first part of the transaction is an HTTP request, and it can only be initiated by a client. The client system sends out an HTTP request to request access to a web page. The second part of the transaction is an HTTP response. A web page located on a server system sends back the HTTP response.

Even with loop-hole 150, firewall 140 provides a certain amount of security for client system 110. That is, since HTTP transactions can only be initiated by client systems, firewall 140 can be designed to only allow out-going HTTP requests and only allow in-coming HTTP responses that correspond to the out-going HTTP requests. Any of a number of known firewall security systems with HTTP loop-holes can be traversed using the present invention.

As discussed in more detail below, the present invention utilizes loop-hole 150 to create a TCP/IP like connection between client system 110 and server system 120 by sending messages out as HTTP formatted requests and receiving messages back as HTTP formatted responses. In this manner, the present invention maintains the level of security provided by firewall 140 while providing a TCP/IP-type connection.

Figure 2:
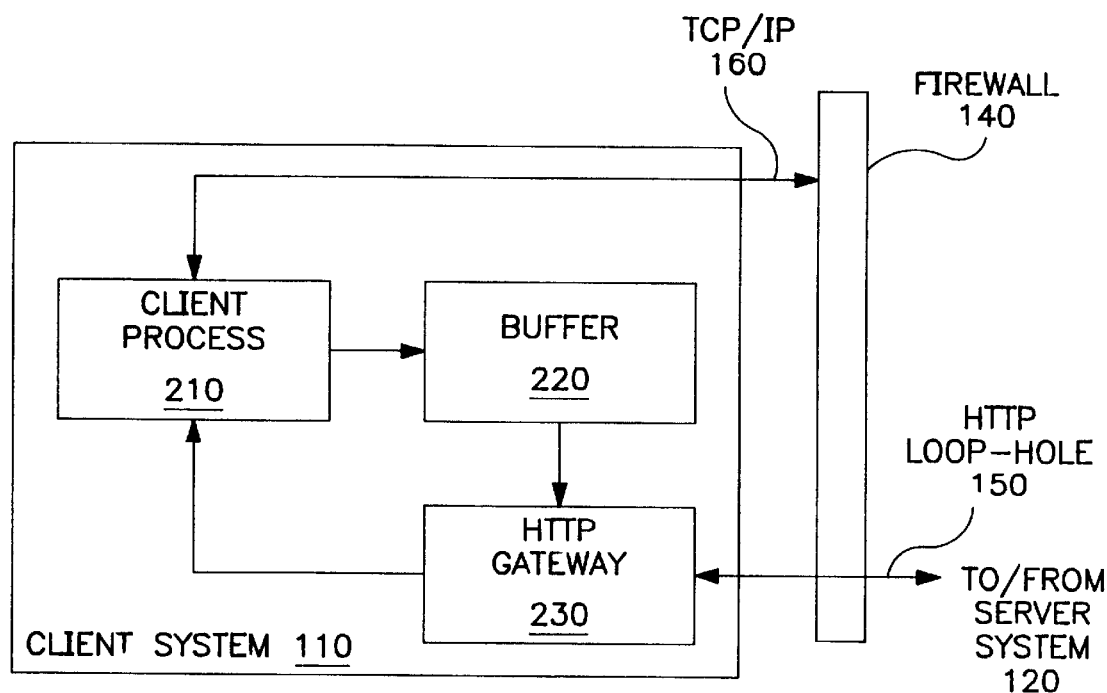
FIG. 2 illustrates one embodiment of a client system.

FIG. 2 shows one embodiment of client system 110 and firewall 140. Client system 110 includes client process 210, buffer 220, and HTTP gateway 230 coupled as shown. HTTP gateway 230 represents any of a number of HTTP gateways known in the art, and is used by client system 110 for internet web browsing. Client process 210 is the portion of a distributed program that is executed on client system 110. If it were not for firewall 140, client process 210 could communicate with server system 120 using TCP/IP 160. For instance, the distributed program described in the above referenced patent application uses an asynchronous TCP/IP protocol in which messages can be initiated from client system 110 or server system 120. In the illustrated example however, firewall 140 prevents TCP/IP communications. In which case, client system 110 can switch to communications through HTTP loop-hole 150.

Client system 110 can automatically recognize firewall 140 in any of several different ways. For instance, client system 110 could send a TCP/IP formatted request to server system 120 asking for a response from server system 120. If no response were received within a certain time frame, client system 110 could time out and try an HTTP formatted request sent through loop-hole 150.

Figure 3:
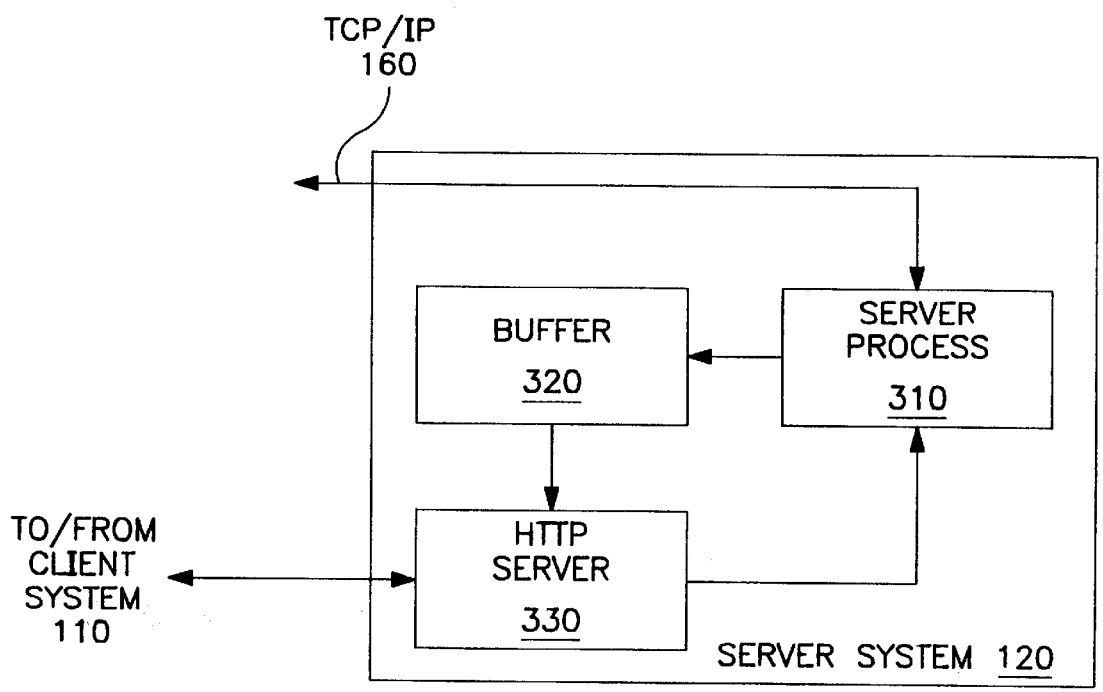
FIG. 3 illustrates one embodiment of a server system.

FIG. 3 illustrates one embodiment of server system 120. Server system 120 includes server process 310, buffer 320, and HTTP server 330 coupled as shown. In one embodiment, HTTP server 330 comprises dedicated software to play the role of an HTTP server, but is specially designed to include messages in transmissions without the overhead of HTTP servers known in the art. Alternately, HTTP server 330 can represent any of a number of HTTP servers known in the art having a Common Gateway Interface (CGI). Software can use a CGI to modify HTTP transactions according the teachings of the present invention.

Server process 310 is the portion of the distributed program executing on server system 120. Server process 310 can communicate with any number of client systems 145 using TCP/IP communications. Firewall 140, however, prevents server process 310 from communicating with client system 110 using TCP/IP 160. Like client system 110, server system 120 could detect firewall 140 in any of several different ways. Server system 120 cannot initiate an HTTP transaction though, so it waits for an HTTP request from client system 110.

Since HTTP transactions are necessarily two part transactions that are initiated by a client, HTTP communications tend to be somewhat slower and more cumbersome than most TCP/IP formatted communications. Therefore, distributed programs will most likely attempt a TCP/IP connection first. If that fails, client system 110 and server system 120 buffer TCP/IP messages and send groups of messages in bundles to reduce the frequency of HTTP transactions, thereby increasing throughput to approximate that of TCP/IP connections. Also, since internet connections are inherently unreliable, client system 110 and server system 120 continue to store the messages even after they are sent in order to ensure reliability. Messages are only removed from their respective buffers upon notification from the other system that the messages were received correctly.

In FIG. 2, client system 110 performs these functions by buffering messages from client process 210 in buffer 220. From there, the messages are grouped into a bundle and sent out through HTTP gateway 230, through HTTP loop-hole 150 in firewall 140, and on to server system 120. When a corresponding HTTP response is received from server system 120, the response comes back through loop-hole 150 to HTTP gateway 230, and on to client process 210.

In FIG. 3, server system 120 buffers messages from server process 310 in buffer 320. After a request comes in, server system 120 groups messages stored in buffer 320 into a bundle and includes them in an HTTP formatted response through HTTP server 330. Any messages that arrive with the request are provided to server process 310.

Since each HTTP transaction consists of a request and a corresponding response, and an HTTP transaction is initiated by a client system, both systems rely on the other system to keep the lines of communications open. That is, server system 120 can only respond after it has received a request. For the HTTP connection to operate like a bi-directional TCP/IP connection, wherein both client system 110 and server system 120 may be able to initiate transmissions, client system 110 and server system 120 must work together to keep a request outstanding.

In one embodiment, client system 110 sends a first request including any messages stored in buffer 220 up to a maximum bundle size. Client system 110, however, will not sit idle waiting for a response from server system 120. Instead, client system 110 continues to store additional messages, if any, and will send another request upon the occurrence of one of three events.

First, if a certain number of additional messages accumulate in buffer 220, then client system 110 will send a second request including the additional messages. For instance, a maximum bundle size may be ten messages, and as soon as ten additional messages accumulate, client system 110 will send a second request including the 10 additional messages.

Second, if a certain amount of time passes without receiving a response, client system 110 will send a second request, even if no additional messages have accumulated, including any stored messages. For instance, if a request is lost in an unreliable network, a response may never be received. Client system 110 may time out in, for instance, one second and assume that an error occurred. Where the first request included five messages, and three additional messages have accumulated before client system 110 timed out, then client system 110 will send a second request including all eight messages.

Third, if client system 110 receives a response from server system 120, client system 110 will send a second request. In this third case, depending on factors such as the available bandwidth and the number of accumulated additional messages, client system 110 may send the second request immediately upon receiving the response from server system 120, or client system 110 may delay for a short period of time to allow more messages to accumulate.

On the server side of the transaction, server system 120 must wait to receive a first request. While server system 120 waits, it stores out-going messages. When server system 120 does receive a first request, server system 120 may not respond immediately. First, if a certain number of messages have accumulated, or if at any point after the first request is received the certain number of messages accumulate, then server system 120 will send a response. For instance, if a maximum bundle size is 10 messages, and server system 120 has 10 messages stored when the first request is received, server system 120 will respond immediately. If, however, the number of messages is less than the certain number of messages, server system 120 will wait for more messages to accumulate or for a second request to arrive. When a second request is received, server system 120 will send a response corresponding to the first request, and include any messages that have accumulated, up to the maximum bundle size, even if no messages have accumulated. As with client system 110, depending on factors such as available bandwidth and the number of accumulated messages, server system 120 may immediately respond upon receiving the second request, or server system 120 may delay for a short period of time to allow more messages to accumulate.

In operation, a series of error-free transfers may proceed as follows. Client system 110 sends a first request. Server system 120 receives the first request but does not respond. A short time later, client system 110 sends a second request. Server system 120 responds to the first request after the second request is received. Client system 110 continues to send more requests and, for each new request, server system 120 responds to the previous request. In this fashion, client system 110 and server system 120 work together to keep one request outstanding at server system 120 so that server system 120 can always respond.

In various embodiments, the delay and the maximum number of messages in a bundle can be optimized to achieve increased throughput and to approximate the throughput of a TCP/IP connection. The implementation can be transparent to higher level applications such as client process 210 and server process 310. For example, an application written assuming a direct TCP/IP connection between client system 110 and server system 120 can be switched to using the HTTP protocol with no changes to the application code or behavior, and for many applications, with only negligible degradation in performance.

In alternate embodiments, server system 120 may hold more than one outstanding request so that, for instance, server system 120 can send several responses in close succession to handle a large data block. The number of requests held outstanding by server system 120 is limited, however, by factors such as the size of buffer 220 in client system 110, the time duration before client system 110 times out, and the maximum bundle size. For instance, since messages are only removed from buffers upon notification that the messages were received, messages accumulate in buffer 220 if no responses are received. Also, client system 120 times out and resends messages when it assumes an error has occurred. If the number of accumulated messages exceeds the maximum bundle size, the number of requests client system 110 sends could rapidly increase, needlessly wasting bandwidth.

FIG. 4 illustrates one embodiment of an HTTP request in more detail. An HTTP request includes header information which identifies it as an HTTP request, specifies the destination of the request, and specifies various additional characteristics. The header can be followed by data in any format. In the illustrated embodiment, the data includes a prefix indicating which messages, if any, client system 110 received in the last response from server system 120. Here, the prefix indicates that client system 110 received messages 1 through N in the last response. After the prefix, the request also includes copies of all the messages 1 through M stored in buffer 220. When the request is received by server system 120, server system 120 will provide messages 1 through M to server process 310. Server system 120 will also remove messages 1 through N from the messages stored in buffer 320 and send only the remaining messages, if any, in the next response.

FIG. 5 illustrates one embodiment of an HTTP response. Like the request, the response includes header information which identifies it as an HTTP response corresponding to a particular HTTP request, specifies the destination, and specifies various additional characteristics of the response. The header can be followed by data in any format. In the illustrated embodiment, the data includes a prefix indicating which messages, if any, server system 120 received in the last request. Here, the prefix indicates that server system 120 received messages 1 through M in the last request. After the prefix, the response also includes copies of the messages 1 through N stored in buffer 320. When the response is received by client system 110, client system 110 will provide messages 1 through N to client process 210, remove messages 1 through M from the messages stored in buffer 220, and send only the remaining messages, if any, in the next request.

Neither system removes a message from its buffer before receiving an indication that the message was received. Also, as discussed above, client system 110 will send a request if a response is not received within a certain amount of time. For example, if a request never reaches server system 120 for whatever reason, client system 110 will send another request including the same messages and any additional messages that may have accumulated. Similarly, if a response never arrives, client system 110 will send another request and server system 120 will send another response including the same messages and any additional messages that may have accumulated. Furthermore, if a request or a response is received, but the messages are unreadable, the corresponding returned prefix will indicate that the messages were unreadable and the messages will be resent. In this manner, the present invention provides reliable message transmission over inherently unreliable communications media.

Figure 6:
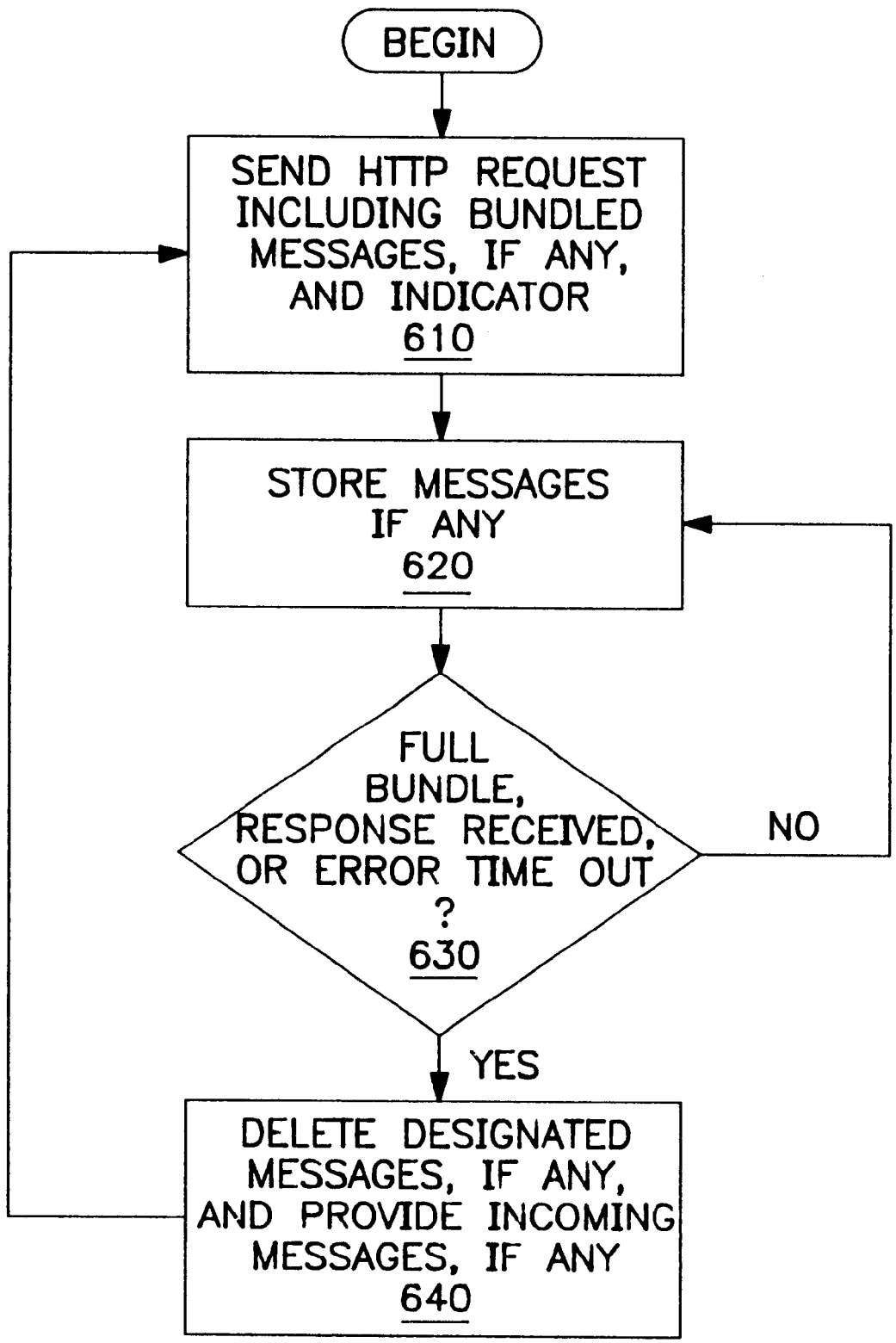
FIG. 6 illustrates the process of one embodiment of a client system.

FIG. 6 illustrates the procedure executed by one embodiment of client system 110. In block 610, client system 110 sends out an HTTP request, including copies of any messages stored in buffer 220, as well as an indicator of which messages, if any, client system 110 received in the last response. If a request is a first request, the last response did not include any messages, or the messages from the last response were unreadable, the indicator will indicate that zero messages were received. While client system 110 waits to receive a response, additional outgoing messages, if any, are stored in buffer 220, in blocks 620 and 630. If a certain number of messages accumulate, client system 110 will proceed to block 640. Since no response was received, no action will be taken in block 640, and client system 110 will return to block 610 and send out another request including the additional messages. For instance, if the maximum bundle size is ten messages, and ten additional messages accumulate, another request including the ten messages will be sent.

If, in block 630, a response is received before the certain number of messages accumulate, the process will again proceed to block 640. When a response is received, the response will include a prefix and any messages sent from server system 120. The prefix will indicate which messages, if any, server system 120 received in the last request. If the request contained no messages, or there was an error and no messages were readable, the prefix will indicate zero messages. Client system 10 will remove any indicated messages from buffer 220 in block 640. Any messages included in the response will also be provided to client process 210. Then, the procedure loops back to block 610 and a new request is sent including a prefix and any stored messages.

As discussed above, depending on factors such as the available bandwidth and the number of stored messages, client system 110 may send a request immediately upon receiving a response, or it may delay for a period of time to allow more messages to accumulate.

Client system 110 may time out in block 630 before a response is received or a bundle of additional messages accumulate. For instance, even if the maximum bundle size is ten messages and only three have accumulated, client system 110 will time out after a certain amount of time. An error may have occurred or server system 120 may be waiting for a second request. In either case, client system 110 will proceed to block 640. Since no response was received, no action will be taken in block 640 because no messages have been designated and no messages have been received. Instead, client system 110 will proceed to block 610 and send out any stored messages, including the messages sent in the first request, up to a maximum bundle size. If the number of accumulated messages exceeds the maximum bundle size, client system 110 may send more than one request. Furthermore, client system 110 may indicate that a connection has failed after a certain number of requests have been sent without receiving a response.

Figure 7:
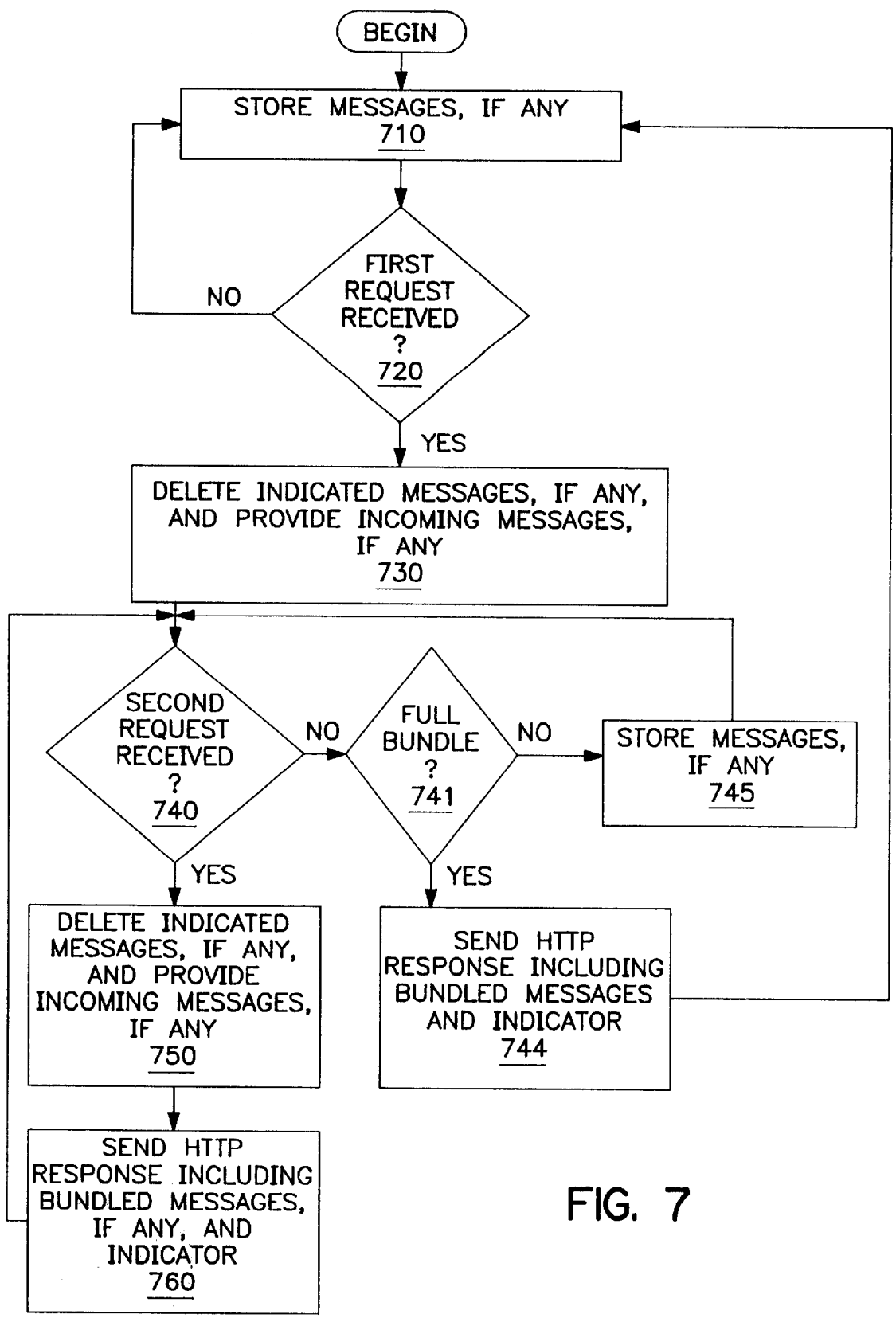
FIG. 7 illustrates the process of one embodiment of a server system.

FIG. 7 illustrates the procedure executed by one embodiment of server system 120. In block 710, server system 120 stores out-going messages, if any, and waits for a first request in block 720. If a first request is received, the request will include a prefix indicating which messages, if any, the client system received in the last response. If the last response did not include any messages or there was an error and no messages were readable, the prefix will indicate that zero messages were received. The request will also include any messages sent from client system 110. In block 730, server system 120 will remove any indicated messages from those stored in buffer 320 and provide any incoming messages to server process 310. Then, server system 120 will hold the first request until a second request is received in block 740 or until a certain number of messages have accumulated in blocks 741 and 745. For instance, if the maximum bundle size is ten messages and ten messages have accumulated, then server system 120 will proceed from block 741 to block 744 even though a second request has not been received. In block 744, server system 120 will send a response corresponding to the first request including the stored messages, and return to block 710 to wait for another first request.

If, in block 740, a second request is received, server system 120 will proceed to block 750 even if no messages have accumulated. In block 750, any indicated messages will be deleted from buffer 320 and any incoming messages will be provided to server process 310. In block 760, a response corresponding to the first request will be sent out including any stored messages. Server system 120 will return to block 740 to wait for another request or a full bundle of messages. If another request is received, client system 120 is already holding one request, so the new request will be treated like a second request and client system 120 will proceed through block 750 and send out another response in block 760. Furthermore, as long as one request is held at block 740, any time a bundle of messages accumulate, server system 120 can issue a response corresponding to the held request.

As discussed above, depending on factors such as the available bandwidth and the number of stored messages, server system 120 may send a response immediately upon receiving a second request, or it may delay for a period of time to allow more messages to accumulate. Also, in certain embodiments, server system 120 will time out if a request is not received within a certain time frame, in which case server system 120 may indicate that a connection has failed.

Once the HTTP connection is established between client system 110 and server system 120, either system can terminate the connection in any of a number of ways. For instance, a request or a response could include a predetermined termination message.

In alternate embodiments, the indications of which messages were received in the last transmission can be provided in any manner as long as the appropriate information is provided and the information can be identified by the appropriate system. For example, a suffix could be used, or messages could be individually number rather than specified in a range so that individually lost messages could be identified.

Any number of hardware systems can be used to perform the functions of client system 110 or server system 120. For example, each system may be represented by a broad category of computer systems known in the art, such as a computer system equipped with a high performance microprocessor(s), such as the Pentium® processor, Pentium® Pro processor, or Pentium® II processor manufactured by and commonly available from Intel Corporation of Santa Clara, Calif., or the Alpha® processor manufactured by Digital Equipment Corporation of Maynard, Mass.

Figure 8:
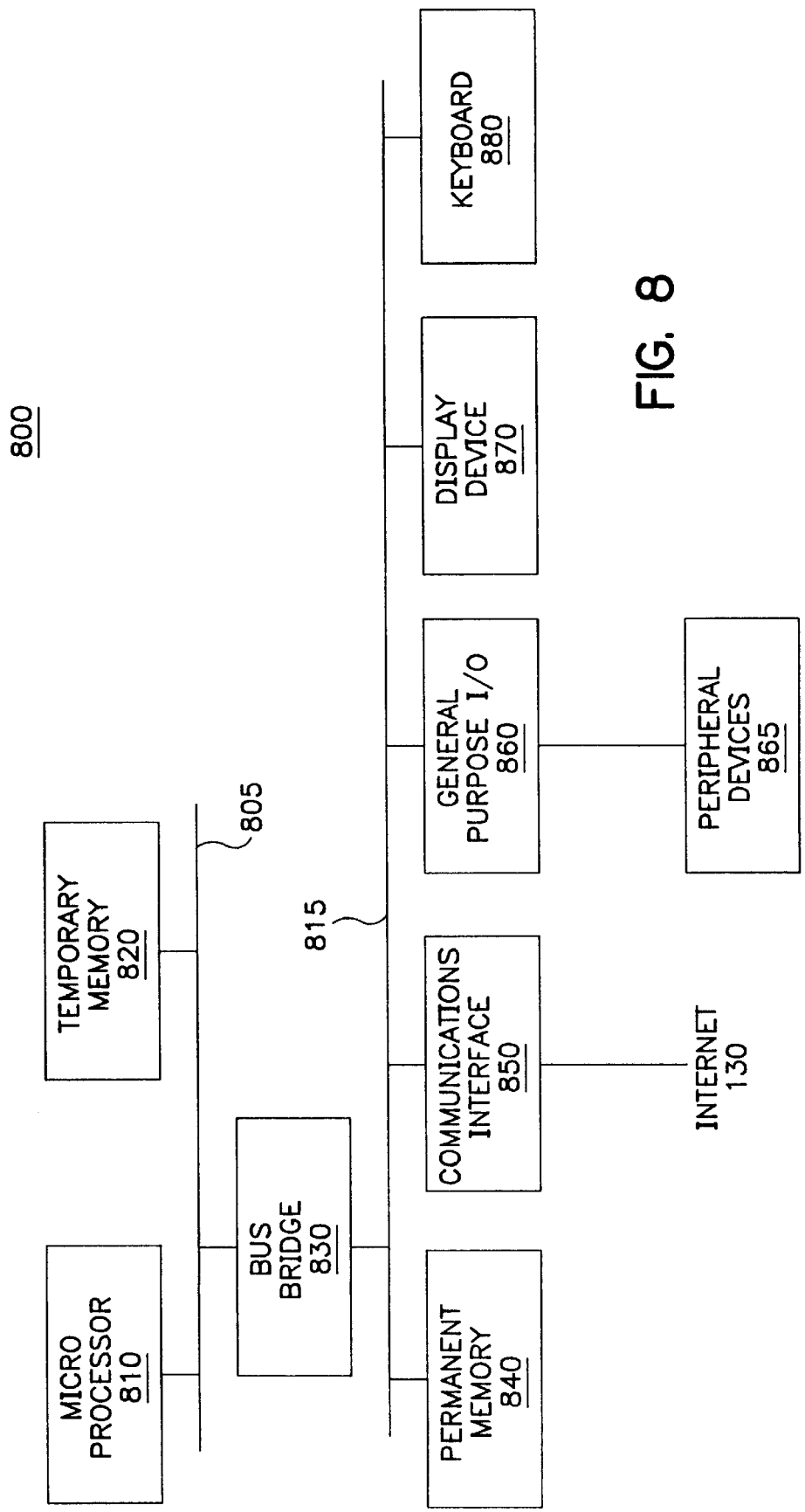
FIG. 8 illustrates on embodiment of a hardware system operative to perform the functions of a client system or a server system.

FIG. 8 illustrates one embodiment of a suitable hardware system 800. In the illustrated embodiment, hardware system 800 includes microprocessor 810 coupled to high performance bus 805, which is coupled to input/output (I/O) bus 815 through bus bridge 830. Temporary memory 820 is coupled to bus 805. Permanent memory 840 is coupled to bus 815. Display device 870, keyboard 880, communications interface 850, and general purpose I/O 860 are all coupled to bus 815. Communications interface 850 can couple hardware system 800 to internet 130. General purpose I/O 860 can couple hardware system 800 to any of a number of external devices.

Certain embodiments may include additional components, may not require all of the above components, or may combine one or more components. For instance, temporary memory 820 may be on-chip with microprocessor 810. Alternatively, permanent memory 840 may be eliminated and temporary memory 820 may be replaced with an electrically erasable programmable read only memory (EEPROM), such as a Flash memory, wherein software routines are executed in place from the EEPROM. Some implementations may employ a single bus, to which all of the components are coupled, or a number of additional buses. Additional components may also be included in the hardware system, such as additional processors, storage devices like a CD ROM, memories, and other peripheral components known in the art.

In one embodiment, the procedures of client system 110 or server system 120, as discussed above, are implemented as a series of software routines run by hardware system 800. These software routines comprise a plurality or series of instructions to be executed by a microprocessor in a hardware system, such as microprocessor 810. Initially, the series of instructions can be stored on a storage device, such as permanent memory 840. It is to be appreciated, however, that the series of instructions can be stored using any conventional storage medium, such as a diskette, CD-ROM, magnetic tape, digital video or versatile disk (DVD), laser disk, ROM, Flash memory, etc. It is also to be appreciated that the series of instructions need not be stored locally, and can be received from a remote storage device, such as another server system on any of a number of networks, a CD ROM device, a floppy disk, etc. The instructions may be copied from the storage device into temporary memory 820 and then accessed and executed by microprocessor 810. In one implementation, these software routines are written in the JAVA™ programming language. It is to be appreciated, however, that these routines may be implemented in any of a wide variety of programming languages.

In alternate embodiments, client system 110 or server system 120 are implemented in discrete hardware or firmware. For example, one or more application specific integrated circuits (ASICs) could be programmed with the above described functions of client system 110 or server system 120. In another example, client system 110 or server system 120 could be implemented in one or more ASICs on an additional circuit board and the circuit board could be inserted into hardware system 800.

The present invention has a wide range of uses. For instance, it can be used by virtually any distributed program to traverse virtually any firewall which allows HTTP formatted transactions. Furthermore, the present invention can use any protocol format which is permitted to initiate bi-directional communications from behind a firewall. HTTP/1.0 is just one such format. HTTP/1.1 and other such formats can also be used.

The present invention may be applied to a variety of distributed programs executing on a variety of networks including intranets. Furthermore, the present invention can be used by multiple client systems concurrently to access one or more servers through multiple firewalls. Therefore, for the purposes of this patent, client system refers to any system which makes requests on any other system. Similarly, server system refers to any system to which requests are made. A system can be both a client system and a server system concurrently.

Thus, a method and apparatus for allowing distributed programs to traverse firewalls is described. Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims.

What is claimed is:

1. A computer-implemented method of maintaining bi-directional communication between a client system and a server system, comprising:

transmitting at least two requests across a firewall from a client to a server, said requests each:
including an indication of messages previously received from the server system; and
requiring a response;

wherein the server system is adapted to maintain an open communication link with the client system by keeping at least one response outstanding, said firewall adapted to prevent data traffic initiated by the server system from accessing the client system.

2. The method of claim 1 wherein the transmitting step further comprises:

storing a set of messages at the client system;

sending a first request from the client system to the server system through the firewall, said first request to include a copy of the set of messages; and waiting to receive a first response at the client system from the server system through the firewall.

3. The method of claim 2 wherein the transmitting step further comprises:

storing additional messages at the client system; and sending a second request from the client system to the server system through the firewall if a particular number of messages accumulate at the client system, said second request to include a copy of the additional messages.

4. The method of claim 2 wherein the transmitting step further comprises:

storing additional messages at the client system; and sending a second request from the client system to the server system through the firewall if a particular period of time passes before receiving the first response, said second request including a copy of the first set of messages and a copy of the additional messages.

5. The method of claim 2 wherein the transmitting step further comprises:

storing additional messages at the client system;

receiving the first response from the server system at the client system, said first response including an indication of messages received at the server system in the first request;

removing the indicated messages from the client system; and sending a second request from the client system to the server system through the firewall based on receiving the first response, said second request including a copy of any messages stored at the client system.

6. The method of claim 2 wherein the first request includes an indication of messages received at the client system from the server system in a previous response.

7. The method of claim 1 wherein the transmitting step further comprises:

storing a set of messages at the server system;

waiting to receive a request from the client system at the server system through the firewall; and sending a response from the server system to the client system through the firewall if the request is received and if either a particular number of messages accumulate at the server system or a particular period of time passes since receiving the request, said response including a copy of the set of messages and an indication of any messages received from the client system in the request.

8. The method of claim 1 wherein the transmitting step further comprises:

storing a set of messages at the server system;

waiting to receive a first request and a second request from the client system at the server system through the firewall; and sending a response from the server system to the client system through the firewall if the first and second requests are received, said response including a copy of the set of messages and an indication of any messages received from the client system in at least the first request.

9. The method of claim 1 wherein the transmitting step further comprises:

storing messages at the server system;

receiving a request from the client system at the server system, said request including an indication of messages received by the client system in a previous response;

removing indicated messages from the server system; and sending a response from the server system to the client system through the firewall, said response including a copy of any messages stored at the server system.

10. An apparatus for maintaining bi-directional communication between a client system and a server system, comprising:

a first network device having a memory containing a program that transmits at least two requests across a firewall to a second network device; said requests each:
       including an indication of messages previously received from the server system; and
       requiring a response; and a second network device, coupled to said first network device, wherein said second network device is adapted to maintain data traffic between said first network device by keeping at least one response outstanding, said firewall adapted to prevent data traffic initiated on a server side of the firewall from accessing network devices on a client side of the firewall.

11. A machine-readable storage medium having stored thereon machine executable instructions, the execution of said instructions to implement a method for maintaining bi-directional communication between a client system and a server system, said method comprising:

transmitting at least two requests across a firewall from a client to a server said requests each:
       including an indication of messages previously received from the server system; and
       requiring a response;

wherein the server system is adapted to maintain an open communication link with the client system by keeping at least one response outstanding, said firewall adapted to prevent data traffic initiated by the server system from accessing the client system.

* * * * *